US010924347B1

(12) United States Patent
Narsian et al.

(10) Patent No.: US 10,924,347 B1
(45) Date of Patent: Feb. 16, 2021

(54) NETWORKING DEVICE CONFIGURATION VALUE PERSISTENCE

(71) Applicant: Microsoft Technology Licensing, LLC, Redmond, WA (US)

(72) Inventors: Anish Sagar Narsian, Cupertino, CA (US); Alberto Gonzalez Prieto, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/655,180

(22) Filed: Oct. 16, 2019

(51) Int. Cl.
*H04L 12/24* (2006.01)
*H04L 29/08* (2006.01)
*H04L 12/801* (2013.01)

(52) U.S. Cl.
CPC ...... *H04L 41/0859* (2013.01); *H04L 41/0816* (2013.01); *H04L 41/0853* (2013.01); *H04L 47/12* (2013.01); *H04L 67/10* (2013.01)

(58) Field of Classification Search
CPC ............. H04L 41/0816; H04L 41/0853; H04L 41/0859; H04L 47/12; H04L 67/10
USPC ........................................................ 709/221
See application file for complete search history.

(56) References Cited

U.S. PATENT DOCUMENTS

| 10,324,905 B1 * | 6/2019 | Ross | G06F 16/116 |
| 2016/0050627 A1 * | 2/2016 | Batchu | H04W 76/28 |
| | | | 370/311 |
| 2017/0366672 A1 * | 12/2017 | Newman | H04M 7/0081 |
| 2018/0131520 A1 | 5/2018 | Brockhaus et al. | |
| 2018/0225458 A1 | 8/2018 | Austin et al. | |
| 2018/0309754 A1 | 10/2018 | Magadevan et al. | |
| 2019/0012463 A1 | 1/2019 | Luff et al. | |
| 2019/0097882 A1 * | 3/2019 | Le Merrer | H04W 8/20 |
| 2019/0140906 A1 | 5/2019 | Furuichi et al. | |

(Continued)

OTHER PUBLICATIONS

"Cisco 800M Series ISR Software Configuration Guide", retrieved from <<https://www.cisco.com/c/en/us/td/docs/routers/access/800M/software/800MSCG/routconf.html>>, Feb. 6, 2017, 16 pages.

(Continued)

*Primary Examiner* — Frantz B Jean
(74) *Attorney, Agent, or Firm* — Ogilvie Law Firm

(57) ABSTRACT

Configuration value persistence management (CVPM) tools and techniques provide faster persistence of networking device configuration values than classic approaches. CVPM consolidates configuration dump events based on certain dump conditions. Configuration value changes are journaled, and running configuration values are dumped to a data store only when the dump conditions are satisfied, instead of dumping all of the running configuration values whenever any of them is changed. Both the persistence of configurations and the restoration of persisted configurations are described. Configuration dump conditions may utilize device availability indicators, device load calculations, configuration change load calculations, dump age, or journal size, for example, or combinations thereof, with various thresholds. Thresholds may be hard, soft, or probabilistic. A wide variety of kinds of configuration values for many different kinds of networking devices may be efficiently and safely persisted and restored using CVPM in various computing environments.

20 Claims, 5 Drawing Sheets

(56) References Cited

U.S. PATENT DOCUMENTS

2019/0159113 A1\* 5/2019 Roskind ................. H04L 67/10
2019/0238358 A1 8/2019 Hurewitz

OTHER PUBLICATIONS

"Persistence (computer science)", retrieved from <<https://en.wikipedia.org/wiki/Persistence_(computer_science)>>, Jun. 15, 2018, 4 pages.

\* cited by examiner

SOME CONFIGURATION DUMP CONDITION 504 ASPECTS 700

| MIANTENANCE MODE INDICATOR 702 | REBOOT INDICATOR 706 | DATABASE RELOAD INDICATOR 710 |
|---|---|---|
| SOFTWARE RELOAD INDICATOR 704 | REPLACEMENT INDICATOR 708 | DATABASE TRANSACTION THRESHOLD 712 |

| CONFIGURATION CHANGE REQUEST RATE 742 THRESHOLD 744 | DATABASE TRANSACTION 718 COUNT 716 PREDICTION 714 |
|---|---|
| | CPU LOAD 720 THRESHOLD 722 |
| CONFIGURATION DUMP AGE 746 THRESHOLD 748 | CPU LOAD 720 PREDICTION 724 |
| | USER COUNT 726 THRESHOLD 728 |

| CONFIGURATION CHANGE JOURNAL SIZE 750 THRESHOLD 752 | SESSION 734 COUNT 730 THRESHOLD 732 | PROCESS 740 COUNT 736 THRESHOLD 738 |
|---|---|---|

Fig. 7

SOME ADDITIONAL ASPECTS OF CONFIGURATION VALUES 208

802: IDENTIFIES NODE 804 THAT IS ONE HOP AWAY

806: SPECIFIES A REACHABLE NODE 804

| 808: IDENTIFIES SUBNET 810 | 812: IDENTIFIES PROTOCOL 620 |
|---|---|

814: IDENTIFIES TRUST DOMAIN 816

| 818: IDENTIFIES CLOUD TENANT 820 | 822: IDENTIFIES CUSTOMER 824 |
|---|---|

Fig. 8

NETWORKING DEVICE CONFIGURATION VALUE PERSISTENCE

BACKGROUND

Noon Computing devices are often designed to operate in ways that depend on configuration values. Sometimes changing a configuration value requires opening a device and moving a jumper to form a different electrical connection, but in many cases configuration values are stored in a device's memory, so they can be changed by executing appropriate processor instructions. Sometimes a configuration value change has immediate effect, but in other situations a change to a configuration value can alter the device's operation only after a reboot or some other configuration reload procedure.

System administrators, network administrators, cloud administrators, cybersecurity personnel, and other computing device administrators and users rely on the utilization of current and correct configuration values by computing devices in order for those computing devices to operate as desired. However, configuration values stored in device memory are susceptible to damage or loss from power failures, malware attacks, accidents, and other undesirable events. Accordingly, various attempts have been made to persist configuration values so they can be restored after damage or loss. Persisted values may also be copied to non-configured but otherwise identical (or at least compatible) computing devices in order to partially or fully configure those additional devices.

SUMMARY

Some embodiments described in this document provide improved performance of computing system configuration management. In particular, some embodiments provide faster persistence of networking device configuration values. This is accomplished, for example, by journaling configuration value changes and dumping all configuration values to a data store only in response to certain conditions, instead of dumping all of the configuration values whenever any of them is changed.

Some of the configuration value persistence management (CVPM) embodiments described herein include or are in operable communication with a memory and a CVPM processor. The CVPM processor may be a processor of a networking device whose configuration is being managed, and hence also be used for operations such as network traffic processing, or the CVPM processor may a part of a dedicated CVPM device which is distinct from the networking device whose configuration is being managed. Either way, the CVPM processor is in operable communication with a CVPM memory. The CVPM memory may be viewed as having at least three parts: a software execution part used while executing CVPM software, a configuration change journal, and a configuration value dump. In some embodiments, the CVPM processor is configured to perform CVPM steps which include (a) receiving a configuration change request specifying one or more configuration values of a networking profile which facilitates management of network communications, (b) journaling the received configuration change request by appending it to the configuration change journal, (c) submitting the received configuration change request for application to at least one networking device, (d) determining that a configuration dump condition is satisfied after one or more instances of said receiving, journaling, and submitting steps, and (e) in response to determining that the configuration dump condition is satisfied, dumping current configuration values of the at least one networking device and clearing the configuration change journal. Technical results of such an embodiment's operation include persisted configuration change requests, which are produced with a lower computational overhead than would be incurred by dumping all of the configuration values without journaling any of them.

Some embodiments read one or more previously dumped configuration values from the configuration dump store, apply the dumped configuration values to the networking device, and read from the configuration change journal one or more previously journaled configuration values. After the dumped configuration values are applied to the networking device, these embodiments also apply the journaled configuration values to the networking device.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a block diagram illustrating some aspects of some configuration dump conditions;

FIG. 8 is a block diagram illustrating some additional aspects of networking device configuration values;

DETAILED DESCRIPTION

Overview

Figure 1:
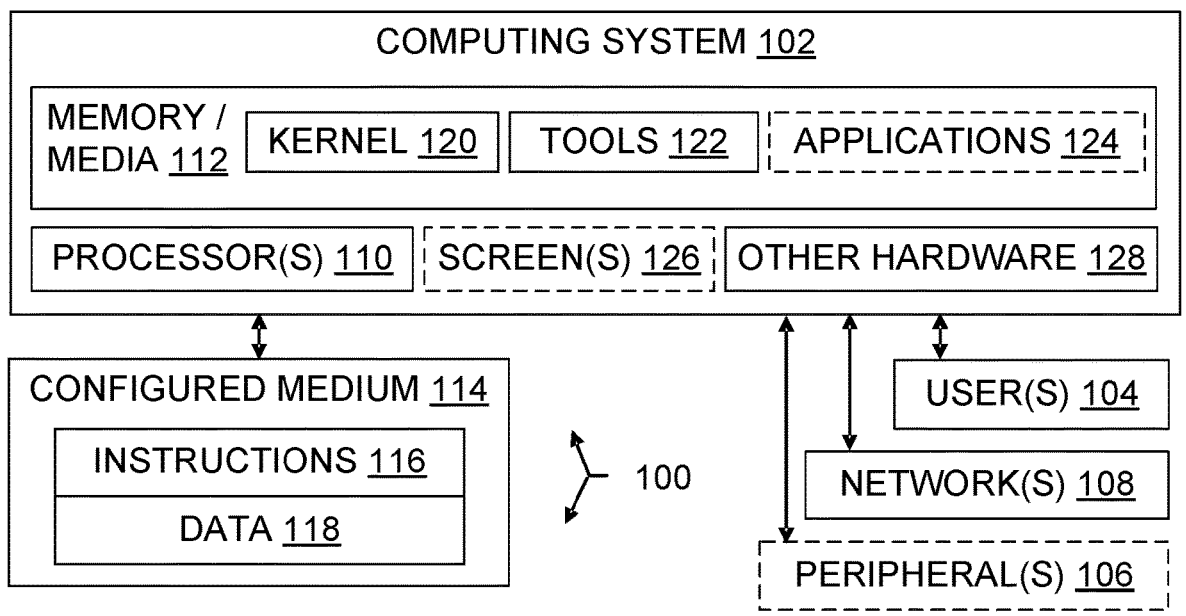
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft innovators who were working to improve the efficiency of Microsoft Azure® cloud offerings (mark of Microsoft Corporation). In addition to providing commercial Azure® offerings, Microsoft is itself a user of many Azure® solutions. Hence, Microsoft is doubly motivated to monitor and improve Azure® cloud efficiency, both on behalf of Microsoft customers and to help Microsoft in the deployment, security, and use of Microsoft's own cloud resources and tools.

In particular, a technical challenge was to how to effectively and efficiently persist networking device configurations. In this context, data such as networking device configuration values is "persisted" when a copy of the data is placed in non-volatile storage. These configuration values may also be referred to simply as the device's "configuration". Accuracy of the persisted configuration copy, future access to that copy, and security of that copy, are each clearly important, but these capabilities are assumed to be a result of persisting the configuration, unless they are otherwise addressed.

Typically, networking device configurations have been persisted by making a copy of the entire configuration in non-volatile storage when any part of the configuration is changed. Making a copy of the entire configuration is also sometimes referred to informally as "dumping" the configuration (note that "dumping" has a more particular meaning herein). As explained below, however, this naïve dumping approach has some disadvantages, especially in a cloud that serves multiple customers. So an emergent technical challenge faced by the innovators was to how to effectively and efficiently persist networking device configurations in an automated manner, at scale, in a cloud.

As used here, "at scale" means there is an average configuration change request rate, in a cloud or other network of interest, over a one hour period, which is at least one change request per minute. In an Azure® cloud with dozens of customers deploying or connecting or terminating respective groups of virtual machines or containers, for example, the corresponding configuration changes for virtual networking devices often occur at scale (mark of Microsoft Corporation). Other cloud service providers also regularly face situations in which configuration change requests for virtual networking devices occur at scale.

Persisting a networking device configuration is expensive in terms of execution time when the volume of configuration data is high, or when configuration changes arrive frequently and result in frequent dumps of the configuration data, or both. But persisting a configuration may also be critical. For instance, in many commercial computing environments a device reboot or reload should not cause any modification in the behavior of the device, because unexpected behavior may cause lost processing time, lost data, corrupt data, expensive personnel time spent identifying the cause of the unexpected behavior, financial or other penalties for violation of a Service Level Agreement, and other undesirable results. A configuration that has not been persisted is often lost after reboot, leading to a different behavior in the rebooted system, and consequential undesired results.

To avoid configuration loss across reboots or reloads, some familiar approaches persist the configuration whenever there is a configuration change. This can be computationally quite expensive. In some scenarios, configuration changes happen very frequently. In an Infrastructure-as-a-Service scenario, for example, a cloud service provider may be responsible for properly making and persisting configuration changes in a cloud data center as tenants log into a cloud or log out of the cloud. Since even a small data center may support hundreds or thousands of tenants at a time, configuration changes may occur at scale. Also, in a Platform-as-a-Service scenario, a cloud service provider may be responsible for properly making configuration changes as a particular tenant deploys or connects or terminates dozens or hundreds of virtual machines or containers. These are merely some examples. In these and other scenarios, the cloud service provider may be responsible, e.g., under a Service Level Agreement, for persisting the configurations. In such cases, it is important that the configuration persistence operations be very efficient.

Some embodiments described herein provide solutions for efficient configuration persistence. An aspect of some solutions is a split of the persisted configuration into two parts. One part of the configuration persistence involves what may be called a "classic" persistence dump, which is expensive. Another part of the configuration persistence involves persisting configuration values separately from the dump, in a different format and at a relatively low cost.

A classic way to persist configuration is to dump the entire running configuration into a text file. This includes going through all the configuration items in the running configuration and rendering them into text; this is called a "classic startup". As the volume of the configuration data increases, or the number of separately accessed configuration values increases, or both, the cost of this classic dump operation increases.

Some embodiments presented herein avoid always executing a complete dump of the running configuration. The number of expensive complete dumps is reduced by keeping a persisted journal of the configuration operations that have been requested since the last complete dumping. The persisted configuration is a union of the classic startup dump and the persisted journal. Efficiency is improved because keeping a persisted journal can be done by appending incoming operations to a file, which is a very low cost operation compared to doing a classic startup dump for each configuration change.

Some embodiments still perform a complete dumping of the running configuration, but not with every configuration change. Instead, all configuration changes are appended to the journal. When the complete dump is performed, the journal is cleared. Once a configuration item copy is stored in the classic startup's dump, there is no need to keep a copy of that item in the journal anymore. Some embodiments still perform the complete dumping when defined dump conditions are met, because otherwise the journal would grow infinitely. Several policies can be used for deciding when to perform a complete dump and clear the journal; examples are discussed herein.

Some embodiments described herein may be viewed by some people in a broader context. For instance, concepts such as changes, conditions, configuration, copying, efficiency, and networking may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to more efficiently persist device configurations at scale in a computing system. Other configured storage media, systems, and processes involving changes, conditions, configuration, copying, efficiency, or networking are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, actions, responses, scenarios, devices, configuration values, software development environments, software processes, development tools, identifiers, files, formats, data structures, notations, control flows, pseudocode, naming conventions, resource actions, network protocols, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as communications with devices in a cloud or other computer network, updating device configurations, and persisting data in files and other digital formats, which are each activities deeply rooted in computing technology. Some of the technical mechanisms discussed include, e.g., journal files, dump stores, conditions that control whether to do a configuration dump, configuration value persistence management software, and configuration values. Some of the technical effects discussed include, e.g., better user experience through better responsiveness, consolidation of configuration changes for multi-change dumps instead of single-change dumps, reduction in total dump execution time, more computationally efficient configuration persistence without any increased risk of lost or damaged configuration values, and computable definitions and assessments of conditions under which full configuration dumps are not done (control by dump conditions as opposed to naively dumping with each configuration change). Thus, purely mental processes are clearly excluded. Some embodiments improve the functioning of computing systems and services by enhancing efficiency through a configuration value persistence management functionality. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
ANSI: American National Standards Institute
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
HTTP: hypertext transfer protocol
HTTPS: hypertext transfer protocol secure
IaaS or IAAS: infrastructure-as-a-service
ID: identification or identity
IoT: internet of things
IP: internet protocol
IPSec: IP secure communication security protocol
LAN: local area network
OS: operating system
PaaS or PAAS: platform-as-a-service
RAM: random access memory
ROM: read only memory
SIEM: security information and event management; also refers to tools which provide security information and event management
TCP: transport control protocol
TLS: transport layer security
UDP: user datagram protocol
UEFI: Unified Extensible Firmware Interface
URI: uniform resource identifier
URL: uniform resource locator
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources to multiple programs or provides resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" 916 means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Configuration value persistence management operations such reading configuration items to dump them, dumping them to a digital store, receiving configuration change requests over a network, submitting configuration change requests to networking devices for application to change the devices' configuration values, journaling configuration change requests by appending them to a file, and many other operations discussed herein, are understood to be inherently digital. A human mind cannot interface directly with a CPU or other processor, or with RAM or other digital storage, to read and write the necessary data to perform the configuration value persistence management steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allowing, appending, applying, associating, basing, buffering, calculating, changing, comparing, computing, creating, crossing, defining, deleting, determining, disallowing, displaying, diverting, dropping, dumping, enhancing, facilitating, indicating, journaling, locating, modifying, noting, operating, performing, persisting, processing, providing, reading, receiving, reducing, residing, satisfying, submitting, triggering, using, utilizing, writing (and allows, allowed, appends, appended, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as computational system or computing system
- 104 users
- 106 peripherals
- 108 network generally, including, e.g., LANs, WANs, software defined networks, clouds, and other wired or wireless networks
- 110 processor
- 112 computer-readable storage medium, e.g., RAM, hard disks
- 114 removable configured computer-readable storage medium
- 116 instructions executable with processor; may be on removable storage media or in other memory (volatile or non-volatile or both)
- 118 data
- 120 kernel(s), e.g., operating system(s), BIOS, UEFI, device drivers
- 122 tools, e.g., anti-virus software, firewalls, packet sniffer software, intrusion detection systems, intrusion prevention systems, debuggers, profilers, compilers, interpreters, decompilers, assemblers, disassemblers, source code editors, autocompletion software, simulators, fuzzers, repository access tools, version control tools, optimizers, collaboration tools, software development tools and tool suites (including, e.g., integrated development environments), hardware development tools and tool suites, diagnostics, and so on
- 124 applications, e.g., word processors, web browsers, spreadsheets, games, email tools, commands
- 126 display screens, also referred to as "displays"
- 128 computing hardware not otherwise associated with a reference number 106, 108, 110, 112, 114
- 200 configuration change request, e.g., one or more packets or other digital messages directed at a kernel or other computational resource management software, which includes one or more configuration values along with at least one command or other instruction to create, modify, or delete a networking device
- 202 device configuration, namely, one or more configuration values
- 204 networking profile, namely, one or more networking device configurations; a single customer could have different networking profiles, e.g., one for development, one for beta-testing, and one for production; also, use of networking profiles helps provide mutual exclusion of customers by expressly associating each customer's respective networking configuration with that particular customer
- 206 networking device, namely, a physical or virtual device capable of sending or receiving (or both) communication over a network; some examples of devices 206 are any computing system 102 which is capable of communication over a cloud 402 or another network 108
- 208 configuration value, namely, a value which controls operational behavior of a networking device; the value may be numeric, textual, Boolean, an enumeration value, or another value, and is represented in a machine-readable digital format
- 210 configuration dump; may also be referred to as a "configuration dump store"
- 300 an example of a configuration value persistence management (CVPM) system
- 302 network traffic; in particular, traffic 302 may include a configuration change request 200 and traffic 302 may also include other traffic such as TCP/IP traffic, HTTPS traffic, and other routine network communications traffic
- 304 configuration change journal
- 400 characteristic, description, or other aspect of a computing environment
- 402 cloud computing environment
- 404 production computing environment; may also be referred to as "live" environment
- 406 virtual machine, e.g., a computing construct which provides hardware virtualization and includes an operating system
- 408 container, e.g., a computing construct which provides user space virtualization and does not itself include an operating system but is nonetheless reliant upon an operating system to execute
- 500 another example of a configuration value persistence management system; in contrast with example CVPM system 300, CVPM system 500 does not necessarily reside outside the networking device whose configuration value persistence is managed using CVPM system 500
- 502 CVPM software, e.g., software which performs one or more of the methods described herein, or implements configuration value persistence management operations described herein, or does both
- 504 configuration dump condition
- 506 computational overhead; may be measured in processor cycles, execution time, memory used, I/O operations performed, or network bandwidth used, for example, or a combination thereof 508 interface to networking device, e.g., network interface card or API, or both 510 data utilized when determining whether a configuration dump condition is satisfied 600 list, table, or other data structure identifying domains with which network communication is allowed, endpoints with which network communication is allowed, or both 602 list, table, or other data structure identifying domains with which network communication is not allowed, endpoints with which network communication is not allowed, or both 604 domain, e.g., an alphanumeric alias for a website IP address, such as "microsoft.com" (this example domain name is not meant to be a live link); may also be referred to as a "domain name"

606 endpoint; may also be referred to as a "URL"; may include a domain plus a query path and optional query parameters, for example 608 security credential, e.g., key, secret, password, pass phrase, token, or digital certificate 610 routing table 612 entry in a routing table, e.g., a route to a virtual machine 614 encryption protocol, or identification of a particular encryption protocol or a particular set of encryption protocols 616 firewall 618 firewall rule 620 communication protocol, e.g., TCP, IP, UDP, HTTP, HTTPS, IPSec 622 service level agreement (SLA)

624 policy implementing part or all of a service level agreement, e.g., an SLA policy on networking, encryption, or VPN settings and protocols 626 virtual private network (VPN), or value specifying an encryption protocol or another operational aspect of a VPN 700 meaning, basis, or other aspect of a configuration dump condition 702 maintenance mode indicator, e.g., a scheduled maintenance window, a scheduled maintenance task, or a system warning of upcoming maintenance 704 software reload indicator, e.g., a scheduled software reload window, a scheduled software reload task, or a system warning of upcoming software reload 706 reboot indicator, e.g., a scheduled reboot window, a scheduled reboot task, or a system warning of upcoming reboot 708 device replacement indicator, e.g., a scheduled device replacement window, a scheduled device replacement task, or a system warning of upcoming device replacement 710 database reload indicator, e.g., a scheduled database reload window, a scheduled database reload task, or a system warning of upcoming database reload 712 database transaction count threshold; this threshold or another threshold may also be referred to as a "cutoff"

714 database transaction count prediction 716 database transaction count 718 database transaction 720 CPU load; may also be referred to as "processing load" or "processor load"; may refer to one or more CPUs 722 CPU load threshold 724 CPU load prediction 726 user count, e.g., number of active users 728 user count threshold 730 session count, e.g., number of active sessions 732 session count threshold 734 session 736 process count, e.g., number of active processes running on a system 102

738 process count threshold 740 process (in the computing sense, not the patent law sense)

Figures 9, 10:
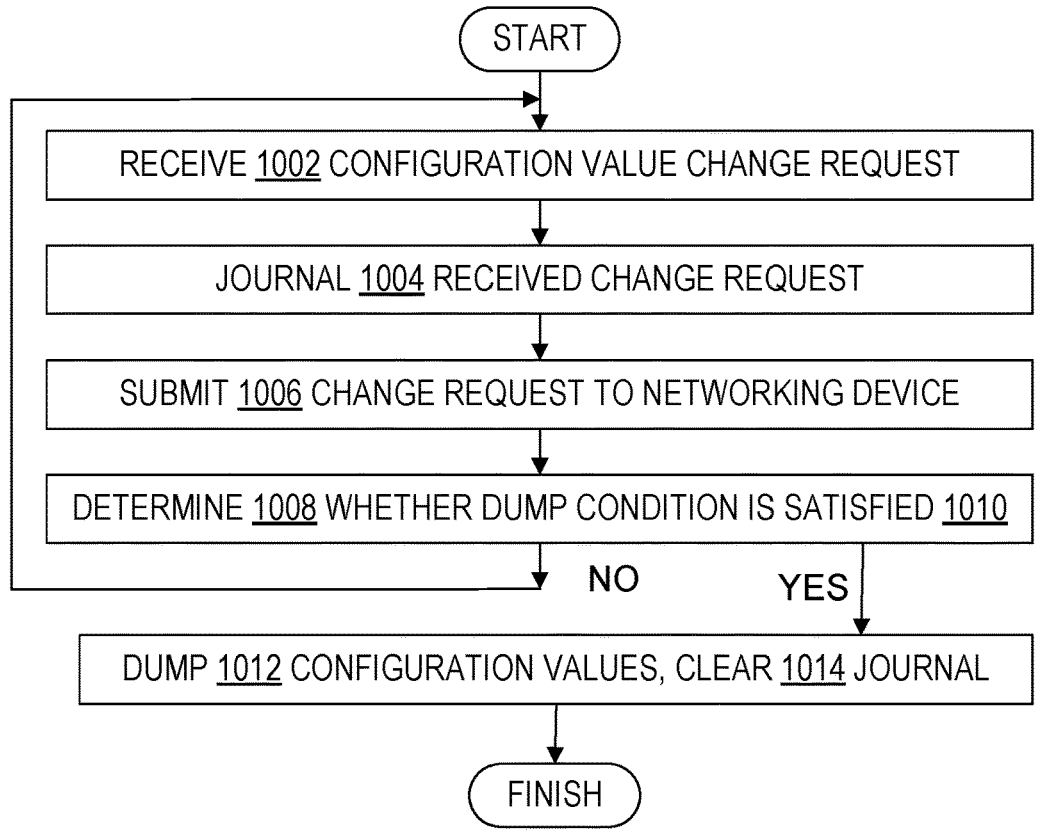
FIG. 9 is a block diagram illustrating some examples of networking devices.
FIG. 10 is a flowchart illustrating steps in some configuration value persistence management methods.

742 configuration change request rate, e.g., number of configuration change requests received by CVPM system in a specified time period; may also be an average 744 configuration change request rate threshold 746 configuration dump age, e.g., number of clock cycles or number of minutes since the configuration dump store received its most recent update 748 configuration dump age threshold 750 configuration change journal size, e.g., in bytes or in number of entries or in events that entered at least one configuration value 752 configuration change journal size threshold 802 configuration value aspect which applies when configuration value identifies a node that is one network hop away from a current node 804 network node, e.g., a networking device or a network interface of a networking device; nodes may be identified as IP addresses or as URLs, for example 806 configuration value aspect which applies when configuration value identifies a node that is reachable from a current node 808 configuration value aspect which applies when configuration value identifies a subnet 810 subnet 812 configuration value aspect which applies when configuration value identifies a network communication protocol 814 configuration value aspect which applies when configuration value identifies a trust domain 816 trust domain 818 configuration value aspect which applies when configuration value identifies a particular cloud tenant 820 cloud tenant, e.g., a user in a cloud computing environment 822 configuration value aspect which applies when configuration value identifies a particular customer 824 customer; may be an individual or an entity such as an enterprise, agency, institution, or other organization 902 network switch 904 router 906 bridge 908 gateway 910 wireless access point 912 networked printer 914 voice over internet protocol (VOIP or VoIP) device 916 internet of things 918 internet of things device 920 virtual networking device, e.g., virtual router 922 physical networking device, e.g., physical router 924 database device, e.g., a server configured by containing or operating on a database 926 storage device 1000 flowchart; 1000 also refers to configuration value persistence management methods illustrated by or consistent with the FIG. 10 flowchart 1002 receive a configuration value change request 1004 journal a configuration value change request; journaling may be done on the networking device to which a configuration change request is submitted, or journaling may be done on a different device, e.g., a proxy 300

1006 submit a configuration value change request to a networking device to be applied to that device or by that device 1008 computationally determine whether a configuration dump condition is satisfied 1010 satisfy a configuration dump condition 1012 dump multiple configuration values to a digital store 210

Figure 11:
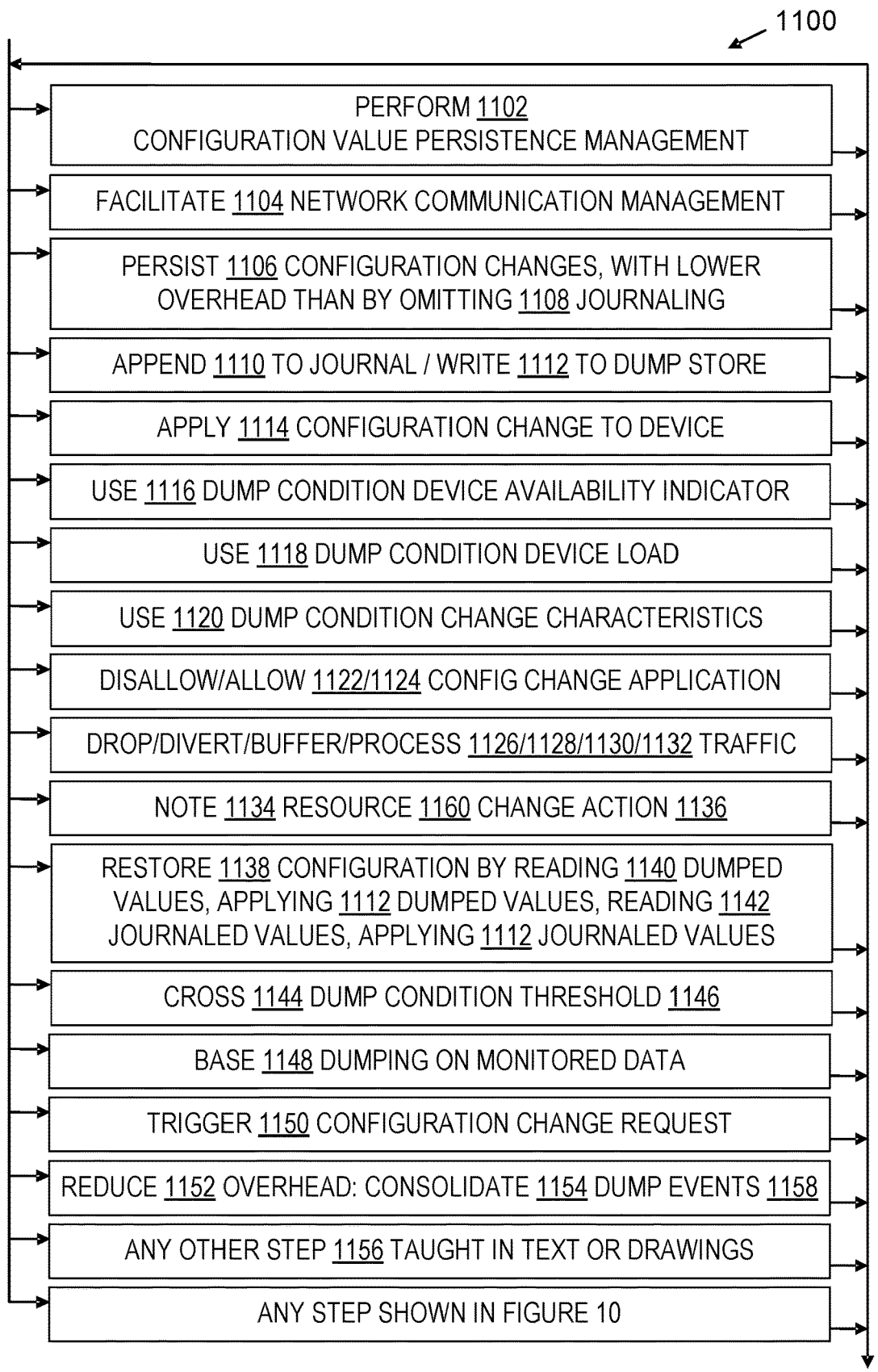
FIG. 11 is a flowchart further illustrating steps in some configuration value persistence management methods.

1014 clear a configuration value journal, e.g., by noting that all configuration values in the journal have been dumped or by deleting all configuration values in the journal after they have been dumped, or both 1100 flowchart; 1100 also refers to configuration value persistence management illustrated by or consistent with the FIG. 11 flowchart (which incorporates the steps of FIG. 10)

1102 perform configuration value persistence management 1104 facilitate management of network communications 1106 persist configuration changes 1108 omit journaling 1004 from configuration value persistence, e.g., rely only on dumping 1012

1110 append a configuration change request to a journal; prepending is considered equivalent to appending for present purposes 1112 write configuration values to storage 1114 apply a configuration change to a particular networking device, e.g., by setting or changing a configuration value used by a kernel of the device; software that applies a configuration change may be called a "configuration change implementer", "updater", "configurator", "deployment engine", or something else 1116 use a device availability indicator in a configuration dump condition determination 1008

1118 use a device load measurement or prediction in a configuration dump condition determination 1008

1120 use a change request measurement or prediction in a configuration dump condition determination 1008

1122 disallow a configuration change from being applied 1114, e.g., by preventing the configuration change or by applying a different change in its place 1124 allow a configuration change to be applied 1114

1126 drop traffic 1128 divert traffic to a different path or different device 1130 buffer traffic, but allow later delivery or processing of the buffered traffic 1132 process traffic within the device identified by the traffic as the traffic's destination 1134 note a resource change action 1136 a resource change action, e.g., creation, modification, or deletion of a computational resource 1138 restore a configuration to a device, e.g., apply a previous configuration to the device 1140 read value(s) from a configuration dump store 1142 read value(s) from a configuration journal; note that reading 1142 may be done differently from reading 1140, because reading 1142 from a journal (e.g., a file to which requests 200 are appended) may be different than reading 1140 from a dump store (e.g., a blob)

1144 cross a dump condition threshold, or ascertain by software execution that such a threshold has been crossed 1146 threshold value generally; may also be referred to as a "cutoff"; may be set by default, by a user, or by an administrator; may be set using a statistical model or a machine learning model; some examples of thresholds 1146 include the thresholds 712, 722, 728, 732, 738, 744, 748, and 752

1148 base dumping on specified monitored data 1150 trigger (cause) a configuration change request 1152 reduce computational overhead 1154 consolidate configuration value dumps into a single dump event, e.g., instead of dumping a configuration after a change request A with change A1 is applied, dumping the configuration again after a change request B with change B1 is applied, and dumping the configuration again after a change request C with change C1 is applied, dump the configuration only after changes A1, B1, and C1 have all been applied 1156 any step discussed in the present disclosure that has not been assigned some other reference numeral 1158 configuration dump event, e.g., an occurrence of a dumping 1012 operation 1160 computational resource, e.g., any digital artifact that provides or uses CPU, memory, or network bandwidth; some examples include systems 102 and software or hardware components thereof, virtual machines 406, containers 408, interfaces 508, data 118, 510, domains 604, endpoints 606, and other items shown in FIGS. 5 through 9

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node 804, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

With reference to FIGS. 1 through 9, some embodiments use or provide a functionality-enhanced system 300 or a functionality-enhanced system 500. The functionality enhancement promotes efficiency and cybersecurity by automatically persisting configuration values 208 in a manner that can be equally as safe as conventional dump-only approaches but also more efficient than them.

Figure 2:
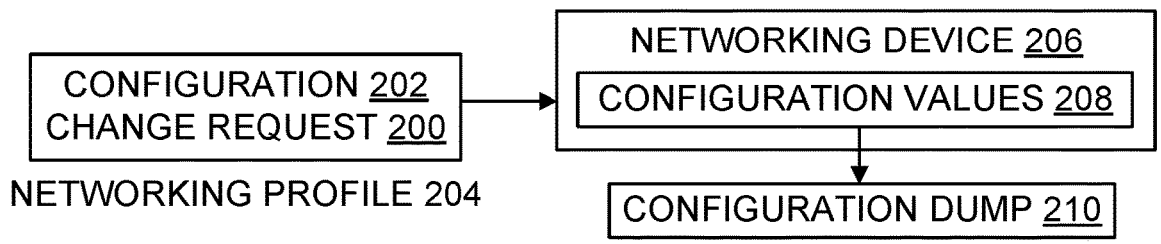
FIG. 2 is a block diagram illustrating an environment which lacks any evident configuration value persistence management enhancements.

FIG. 2 shows an environment 100 which lacks any evident configuration value persistence management enhancements. Configuration change requests 200 are received at a networking device 206 that is targeted by the requests 200, and are applied there to change the device's configuration. The changed configuration 202 is persisted on a per-request basis. That is, each time after a request's configuration value(s) 208 have been applied to the device 206, the device's configuration is written to a dump 210.

Figure 3:
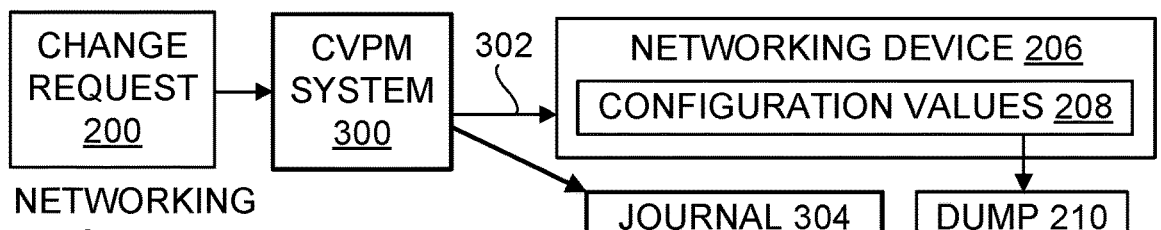
FIG. 3 is a block diagram illustrating an environment which has been enhanced by some configuration value persistence management functionality.

By contrast, FIG. 3 shows an environment 100 which has been enhanced by some configuration value persistence management (CVPM) functionality. In this particular example, the CVPM functionality includes a CVPM system 300 that is external to the networking device 206. However, in other embodiments the CVPM functionality is incorporated into a networking device 206. When a configuration change request 200 is intercepted by the CVPM system 300, the configuration change request 200 is written to a journal 304 in addition to being forwarded as part of the traffic 302 flowing to the networking device 206. Although the journal 304 is shown in FIG. 3 as external to system 300, in some embodiments the journal 304 is integrated within a CVPM system.

Journaling is coordinated with dumping. From time to time, as taught herein, configuration dump conditions will be satisfied. When that occurs, the configuration is dumped to the store 210 and the journal 304 is cleared.

Figure 4:
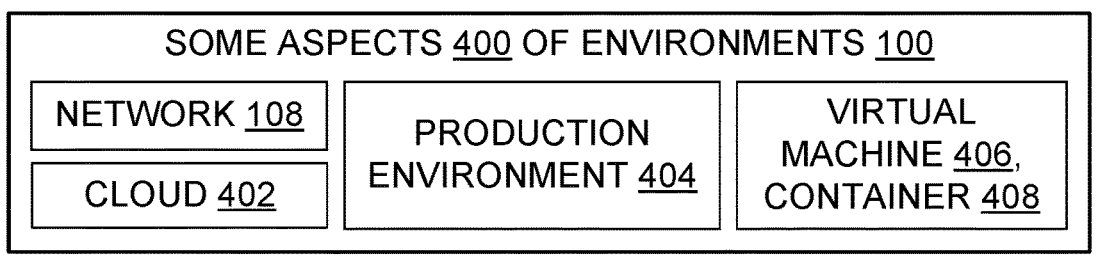
FIG. 4 is a block diagram illustrating some aspects of some computing environments.

FIG. 4 illustrates some aspects of some computing environments. These aspects 400 are discussed as appropriate elsewhere in this disclosure.

Figure 5:
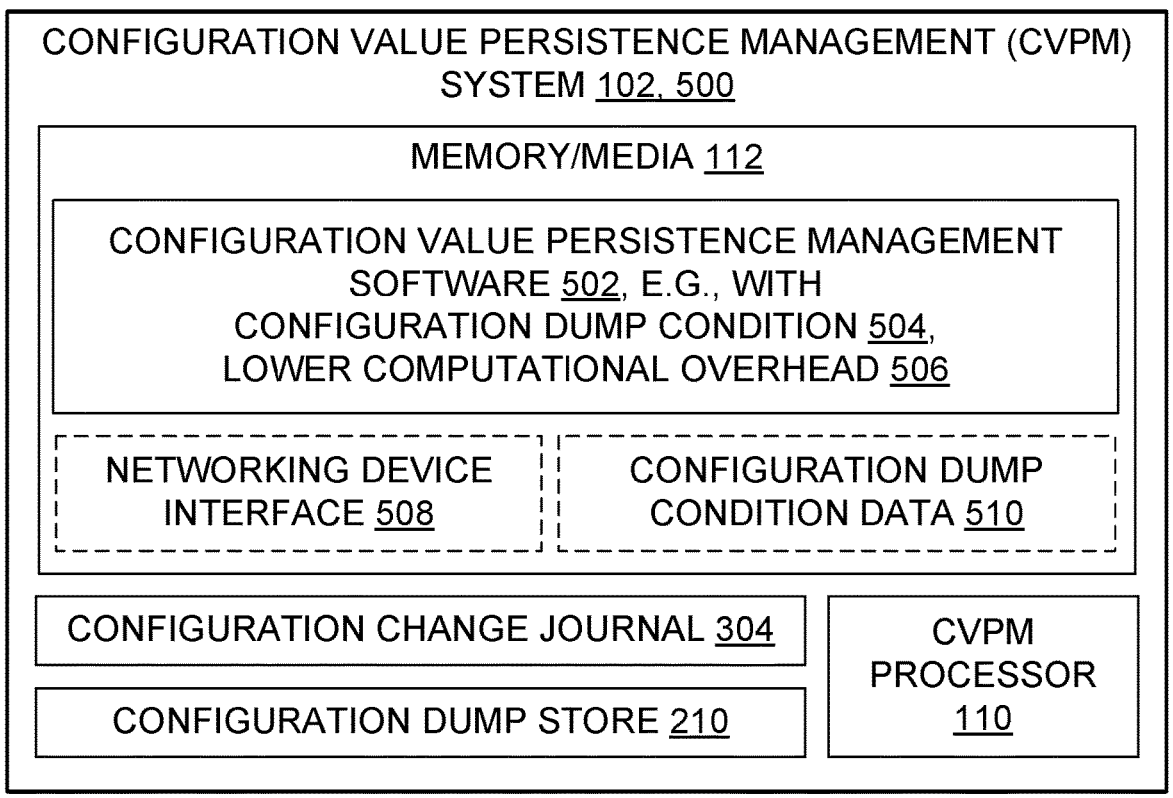
FIG. 5 is a block diagram illustrating aspects of a system which is configured with some configuration value persistence management functionality.

FIG. 5 illustrates some aspects of a system 500 which is configured with some configuration value persistence management (CVPM) functionality. The system 500 may be an integrated subsystem of a networking device or the system 500 may be a stand-alone system that is external to a networking device, with a corresponding interface 508. The system 500 may provide CVPM functionality for a single networking device, or for multiple networking devices.

The illustrated system 500 includes CVPM software 502, a CVPM processor 110, and memory 112. At least a portion of the memory 112 is usable by the CVPM software 502 as the CVPM processor 110 executes that software 502. In the case of a stand-alone system 500, most if not all of the memory 112 would be available to the CVPM software 502. In the case of an integrated system 500, significant amounts of the memory would be devoted to non-CVPM functionality, e.g., as packet buffers and as working memory for a proxy or router or other networking device 206. Similarly, the CVPM processor 110 may be dedicated to executing the CVPM software 502, or the CVPM processor may also execute non-CVPM software, e.g., by firewall rule execution or by execution of data loss prevention software.

The CVPM software 502 upon execution performs one or more of the methods illustrated in FIG. 10 or FIG. 11, or implements configuration value persistence management operations described herein, or does both. In particular, this CVPM software 502 includes software which explicitly or implicitly defines one or more configuration dump conditions 504, and which evaluates data 510 and performs comparisons to determine whether a given configuration dump condition 504 is satisfied at a given point in time. By consolidating configuration changes into fewer dumps, the CVPM software 502 performs configuration persistence with lower computational overhead 506 than the overhead incurred by approaches that dump the configuration on a per-value-change basis or even on a per-request 200 basis.

Figure 6:
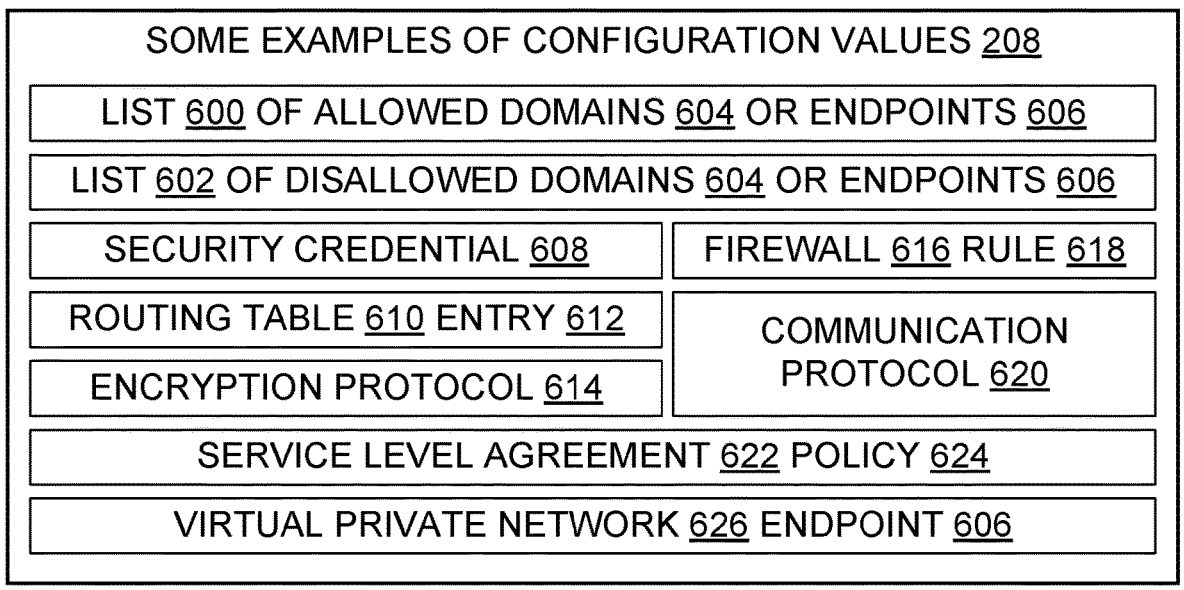
FIG. 6 is a block diagram illustrating some examples of networking device configuration values.

FIG. 6 illustrates some examples of networking device configuration values 208. These examples are discussed as appropriate elsewhere in this disclosure.

FIG. 7 illustrates some aspects 700 of some configuration dump conditions. These aspects are discussed as appropriate elsewhere in this disclosure.

FIG. 8 illustrates some additional aspects of networking device configuration values 208. These aspects are also discussed as appropriate elsewhere in this disclosure.

FIG. 9 illustrates some examples of networking devices. The various examples are not necessarily mutually exclusive, e.g., a router 904 may also be a virtual device 920, and a VOIP device 914 may also operate as a gateway 908. These examples are also discussed as appropriate elsewhere in this disclosure.

In some embodiments, a networking profile configuration value persistence management (CVPM) system 500 includes a configuration dump store 210 including digital storage 112, a configuration change journal 304 including additional digital storage 112, and a CVPM processor 110 in operable communication with the configuration change journal and the configuration dump store. The CVPM processor is configured to perform CVPM steps which include (a) receiving a configuration change request 200 specifying one or more configuration values 208 of a networking profile 204 which facilitates management of network communications, (b) journaling the received configuration change request 200 by appending it to the configuration change journal 304, (c) submitting the received configuration change request for application to at least one networking device 206, (d) determining that a configuration dump condition 504 is satisfied after one or more instances of said receiving, journaling, and submitting, and (e) in response to determining that the configuration dump condition is satisfied, dumping current configuration values 208 of the at least one networking device and clearing the configuration change journal 304. In this manner, the networking profile CVPM system persists configuration change requests 200 associated with networking profiles 204, and does so with a lower computational overhead 506 than would be incurred by dumping all of the configuration values without journaling any of them.

Embodiments may operate with various networking profiles which have various kinds of configuration values. Informally speaking, the values 208 may be any value that operates to limit who can talk to who, and how. The specific examples recited here do not rule out other configuration values 208. With that in mind, in some embodiments the configuration change request 200 specifies at least one of the following configuration values: a routing table entry 612, a firewall rule 618, a virtual private network 626 endpoint or another VPN setting, an encryption protocol 614 for a VPN or otherwise, a network communication protocol 620, a security credential 608, a list 600 of one or more allowed domains 604 or endpoints 606 (sometimes called a "whitelist" 600), a list 602 of one or more disallowed domains 604 or endpoints 606 (sometimes called a "blacklist" 602), or a service level agreement 622 policy 624.

Some configuration dump conditions 504 may be viewed as relating primarily to device 206 availability. Decreased device availability may cause a configuration dump. In particular, in some embodiments the configuration dump condition specifies at least one of the following: a maintenance mode indicator 702 for a networking device transition into a maintenance mode, a reboot indicator 706 for a networking device reboot, a software reload indicator 704 for a networking device software reload, a database reload indicator 710 for a networking device database reload, or a replacement indicator 708 for a networking device replacement. When such an indicator indicates that a networking device 206 may soon undergo a decrease in availability, dumping the device's configuration and clearing the journal are given a higher priority than otherwise.

Some configuration dump conditions 504 may be viewed as relating primarily to networking device load. A lower device processing load may cause a configuration dump. Processing load may be measured, e.g., in terms of CPU load, database transactions, user count, session count, or process count. In particular, in some embodiments the configuration dump condition specifies at least one of the following: a CPU load threshold 722 for comparison to a predicted CPU load 724, a database transaction threshold 712 for comparison to a predicted database transaction count 714, a user count threshold 728 for comparison to an actual or predicted user count 726, a session count threshold 732 for comparison to an actual or predicted session count 730, or a process count threshold 738 for comparison to an actual or predicted process count 736.

Some configuration dump conditions 504 may be viewed as relating primarily to statistics about requests for configuration changes, or about a result of such requests 200. Lower request rates, older dumps, or larger journals can each cause a configuration dump. In particular, in some embodiments the configuration dump condition specifies at least one of the following: a configuration change request rate threshold 744 for comparison to an actual or predicted configuration change request rate 742, a configuration dump age threshold 748 for comparison to an actual or predicted configuration dump age 746, or a configuration change journal size threshold 752 for comparison to an actual or predicted configuration change journal size 750. These conditions, like the others recited in this disclosure, may also be used in combination with one another as a configuration dump condition 504.

Although many of the examples herein involve persisting configuration values, attention is also directed to restoration of configuration values from the dump and the journal. After all, a goal of persisting configurations is to make the configurations available for restoring a networking device 206 to a desirable state after the device's configuration is lost or altered. Notice that the journal 304 is not cleared during the following restoration procedure; the journal gets cleared only when configuration values are dumped. In particular, in some embodiments the CVPM processor 110 is further configured to perform CVPM steps which include: reading 1140 from the configuration dump store 210 one or more dumped configuration values 208, applying 1114 the dumped configuration values to the networking device, reading 1142 from the configuration change journal one or more journaled configuration values, and then, after the dumped configuration values are applied, applying 1114 the journaled configuration values to the networking device. That is, the dumped portion of the configuration 202 is restored first, and then the journaled portion of the configuration 202 is restored.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. Embodiments are not limited to the specific examples, component names, optimizations, algorithmic choices, thresholds, data, data types, implementations, arrangements, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 10 illustrates a method 1000 which is an example of methods that may be performed or assisted by an enhanced system with configuration value persistence management (CVPM) functionality. The enhanced system receives 1002 a configuration change request 200 specifying one or more configuration values 208, journals 1004 the received configuration change request 200, submits 1006 the received configuration change request for application to a networking device 206, and computationally determines 1008 whether a configuration dump condition 504 is satisfied. When the configuration dump condition 504 is not satisfied, the steps 1002, 1004, 1006, and 1008 are repeated. When the configuration dump condition 504 is satisfied, the enhanced system dumps 1012 current configuration values 208 of the networking device and also clears 1014 the configuration change journal 304. This method 1000 persists configuration change requests 200 at a lower computational overhead than would be incurred by naïvely dumping 1012 all of the configuration values each time they are received 1002, without journaling 1004 any of them.

FIG. 11 further illustrates CVPM methods (which may also be referred to as CVPM "processes" in the legal sense of the word "process") that are suitable for use during operation of an enhanced system. FIG. 11 includes some refinements, supplements, or contextual actions for steps shown in FIG. 10. FIG. 11 also incorporates steps shown in FIG. 10. Technical processes shown in the Figures or otherwise disclosed will be performed automatically, e.g., by a CVPM system 300 or 500, unless otherwise indicated. Processes may also be performed in part automatically and in part manually to the extent action by a human administrator or other human person is implicated, e.g., in some embodiments a human administrator may specify one or more thresholds 1146. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 10 and 11. Steps may be performed serially, in a partially overlapping manner, or fully in parallel. In particular, the order in which flowchart 1000 action items or flowchart 1100 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method of managing persistence of configuration values of a networking device, the method including: receiving 1002 a configuration change request specifying one or more configuration values, journaling 1004 the received configuration change request by appending 1110 it to a configuration change journal, and submitting 1006 the received configuration change request for application to at least one networking device. This method also includes determining 1008 that a configuration dump condition is satisfied 1010 after one or more instances of said receiving, journaling, and submitting. In response to determining 1008 that the configuration dump condition is satisfied, the method includes dumping 1012 current configuration values of the at least one networking device and also includes clearing 1014 the configuration change journal.

Some embodiments utilize a blocking approach to dumping. Others do not, but it is presently expected that a blocking approach will likely be used more than a nonblocking approach. Under one blocking approach, dumping 1012 current configuration values of a particular networking device includes disallowing 1122 any application of configuration changes to the particular networking device, writing 1112 to a configuration dump store at least one configuration value of the particular networking device, and then allowing 1124 a configuration change to be applied to the particular networking device. The disallowing 1122 may be accomplished, e.g., using one or more of dropping 1126 traffic, diverting 1128 traffic, or buffering 1130 traffic.

Some embodiments operate with configuration values 208 that may be characterized in various ways. For example, in some embodiments the configuration change request 200 specifies one or more configuration values by specifying at least one of the following: a configuration value 208, 802 that identifies a network node 804 designated here as M that is one hop away from a network node N, a configuration value 208, 806 that specifies a network node M is reachable from a network node N, a configuration value 208, 808 that identifies a network subnet 810, a configuration value 208, 814 that identifies a trust domain 816, a configuration value 208, 812 that identifies a protocol for use by a network node M in communicating with a network node N, a configuration value 208, 818 that identifies a particular cloud tenant 820, or a configuration value 208, 822 that identifies a particular customer 824.

In some embodiments, restoration of configuration values from the dump and the journal is performed for multiple networking devices. Such a method may include reading 1140 from the configuration dump store a collection D of dumped configuration values, applying 1114 each of the collection D dumped configuration values to at least one networking device (the collection D is applied to multiple networking devices, but individual values in D may be applied to only a single device 206), reading 1142 from the configuration change journal a collection J of journaled configuration values, and applying 1114 each of the collection J journaled configuration values to at least one networking device, whereby the collection J is applied to multiple networking devices. In this method, for each of the networking devices, applying dumped configuration values, if any, precedes applying journaled configuration values, if any.

In some embodiments, a networking device does not process traffic while the device's configuration is being restored. This can be accomplished by dropping the traffic, or by buffering (at least some of the) traffic but not processing it, or by diverting traffic. Thus, in some embodiments a configuration restoration method also includes inhibiting traffic processing by a networking device M until after the journaled configuration values are applied, by doing at least one of the following: dropping 1126 traffic that is directed at the networking device M, diverting 1128 traffic that was directed at the networking device M by directing that traffic instead at a networking device N, or buffering 1130 traffic that received at the networking device M and delaying or avoiding content processing within the networking device M of any buffered traffic. In this buffering context, "content processing" includes one or more of: forwarding buffered traffic to another networking device N based on address content of the buffered traffic, or providing payload content of the buffered traffic to an application program running on the networking device M.

In some embodiments, the configuration changes are driven by customers creating, deleting, or modifying resources in a cloud 402. Thus, in some embodiments the method is performed within a cloud 402, and the method includes software noting 1134 a resource change action 1136 by an owner of a networking profile 204. The resource change action includes creating, deleting, or modifying a resource 1160 in the cloud, e.g., deploying or terminating virtual machines 406, deploying or terminating containers 408, setting router tables 610, or creating or closing a VPN 626. A configuration change request 200 is triggered 1150 by the resource change action.

In some embodiments, a threshold 1146 used as part of a configuration dump condition 504 may be characterized as a soft threshold, a hard threshold, or part of a probabilistic approach for determining when to dump a configuration.

In some embodiments which use journal size 750 in a configuration dump condition, determining 1008 that a configuration dump condition is satisfied includes at least one of the following: determining 1008 that an actual size 750 or a predicted size 750 of the configuration change journal has crossed 1144 a specified soft journal size threshold 752 which indicates dumping is allowed; determining 1008 that an actual size 750 or a predicted size 750 of the configuration change journal has crossed 1144 a specified hard journal size threshold 752 which indicates dumping is a high priority; or basing 1148 dumping at least in part on an actual size 750 or a predicted size 750 of the configuration change journal, in that a larger journal size is more likely to trigger dumping than a smaller journal size.

In some embodiments which use processor load size 720 in a configuration dump condition, determining 1008 that a configuration dump condition is satisfied includes at least one of the following: determining 1008 that an actual size 720 or a predicted size 724 of a processor load of the networking device has crossed 1144 a specified soft processor load size threshold 722 which indicates dumping is allowed; determining 1008 that an actual size 720 or a predicted size 724 of a processor load of the networking device has crossed 1144 a specified hard processor load size threshold 722 which indicates dumping has a high priority; or basing 1148 dumping at least in part on an actual size 720 or a predicted size 724 of a processor load of the networking device, in that a smaller processor load size is more likely to trigger dumping than a larger processor load size.

In some embodiments which use configuration change load size 742 in a configuration dump condition, determining 1008 that a configuration dump condition is satisfied includes at least one of the following: determining 1008 that an actual size 742 or a predicted size 742 of a configuration change load has crossed 1144 a specified soft configuration change load size threshold 744 which indicates dumping is allowed; determining 1008 that an actual size 742 or a predicted size 742 of a configuration change load has crossed 1144 a specified hard configuration change load size threshold 744 which makes dumping a high priority so dumping will be performed sooner rather than later; or basing 1148 dumping at least in part on an actual size 742 or a predicted size 742 of a configuration change load of the networking device, in that a smaller configuration change load size is more likely to trigger dumping than a larger configuration change load size.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as CVPM software 502, configuration dump conditions 504 (which are understood to be different from "dump for each change request 200" or the like), a configuration change journal, and configuration dump condition data 510, in the form of data 118 and instructions 116, read from a removable storage medium 114 and/or another source such as a network connection, to form a configured storage medium. The configured storage medium 112 is capable of causing a computer system 102 to perform technical process steps for configuration value persistence management, as disclosed herein. The Figures thus help illustrate configured storage media embodiments and process (a.k.a. method) embodiments, as well as system and process embodiments. In particular, any of the process steps illustrated in FIG. 10 or 11, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 perform a method of managing configuration values 208 of a networking device. This method includes: reading 1140 from a configuration dump store one or more dumped configuration values, applying 1114 the dumped configuration values to the networking device, reading 1142 from a configuration change journal one or more journaled configuration values, and after the dumped configuration values are applied, applying 1114 the journaled configuration values to the networking device.

In some situations, rapid resource changes by cloud tenants give rise to configuration changes. An embodiment may provide better control of access to resources in such situations, relative to approaches that lack CVPM functionality. Thus, some methods support frequent resource change actions by reducing 1152 configuration change request persistence computational overhead 506, e.g., by consolidating 1154 configuration values of multiple journaling events into a single dumping event 1158.

Some embodiments include both restoration of configurations and persistence of configurations; other embodiments include one or the other but not both. When a particular sequence of events is considered for a particular embodiment, the events in that sequence may show restoration first, or they may show persistence first. Of course, persistence of a configuration will precede restoration of that configuration regardless of what a particular sequence shows. Some methods include receiving 1002, a configuration change request; journaling 1004 the received configuration change request by appending it to the configuration change journal; determining 1008 that a configuration dump condition is satisfied after one or more instances of said receiving and journaling; and in response to determining that the configuration dump condition is satisfied, dumping 1012 current configuration values of the at least one networking device and clearing the configuration change journal.

As further illustration of networking devices whose configuration can be persisted using the teachings herein, in some embodiments the networking device for which configuration values are read 1140 from the configuration dump store or read 1142 from the configuration change journal or both includes at least one of the following: a switch 902, a router 904, a bridge 906, a gateway 908, a wireless access point 910, a networked printer 912, a VoIP device 914, an Internet of Things device 918, a virtual networking device 920, a physical networking device 922, a device 924 configured by a database, or a storage device 926.

In some embodiments, configuration values are read 1140 from the configuration dump store or read 1142 from the configuration change journal or both for a plurality of networking devices 206 which are each located in a cloud 402, and each of the plurality of networking devices includes at least one of the following: a switch 902, a router 904, or a firewall 616.

Additional Examples and Observations

One of skill will recognize that not every part of this disclosure, or any particular details therein, are necessarily required to satisfy legal criteria such as enablement, written description, or best mode. Also, embodiments are not limited to the particular networks, devices, protocols, tools, identifiers, fields, data structures, functions, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide or use efficient configuration persistence on networking devices. Persisting a networking device configuration is expensive in terms of execution time when the volume of configuration is high. Persisting a configuration 202 may be critical, e.g., in some situations when a device reboot or reload must not cause any modification in the behavior of the device. Configuration values that have not been persisted are lost after reboot, leading to a different behavior by the device. To avoid configuration loss across reboots and reloads, some environments 100 persist the configuration whenever there is a configuration change. In some scenarios, configuration changes happen very frequently. In those cases, it may be crucial that the persistence of the configuration be very efficient. Some teachings herein provide a solution for efficient configuration persistence.

One aspect of this solution is the split of the persisted configuration into two parts. A part of the configuration is persisted in a classic way, by dumping 1012 the running configuration into a text file, which is expensive. Another part is persisted separately, by keeping a persisted journal 304 of the configuration operations since the last complete dumping, which has a low cost of persistence. Keeping a persisted journal may include or consist of appending 1110 incoming configuration operations to a file. This solution still performs the complete dumping of the running configuration.

But this solution does not need to do this dumping every time a configuration operation is received 1002. It does append to the journal in each such case. When the complete dump is performed, the journal is cleared 1014. Once a configuration item is in the classic startup, there is no need to keep it in the journal anymore. This solution still performs the complete dumping because otherwise the journal would grow infinitely. Several kinds of policies 624 or other dump conditions 504 can be used for deciding when to perform a complete dump; in a particular embodiment these may include periodic, journal-size-based, CPU-load-based, and configuration-load-based policies and conditions, for example. Some implementations operate a per-device journal and dump; some forward each device's configuration to a remote storage location.

In some embodiments which provide efficient persisted configuration replay, a persisted configuration resides partly in a journal 304 and partly in a dump 210 (the dump part is also called a "classic startup"). To replay 1138 the configuration, first the classic startup is applied 1114 to a networking device as a running configuration, and then the journal is replayed, that is, the journal is applied 1114 to the networking device.

In some embodiments which provide efficient configuration storing, an incoming configuration operation is applied 1114 to a networking device running configuration as an update, and the incoming configuration operation 200 is also appended to a journal. When conditions 504 are met 1010, the device's running configuration 202 is rendered 1012 as a classic startup, and the journal is cleared 1014. In some embodiments, a solution blocks any configuration operations that are requested while dumping, to keep the dump and the running configuration consistent with each other.

In some embodiments, configuration dump conditions 504 and the CVPM software that uses them implement one or more policies for performing a classic persistence, i.e., for dumping 1012. Some examples of such policies include the following.

Periodic dumping. A period is chosen so that an average cost of persisting per time unit is low.

Journal-size-based dumping. Dump when the journal exceeds a threshold size. This includes versions where there is a soft threshold (after crossing it, the classic persistence can be performed at any time), and versions where there is a hard threshold (after crossing it, the classic persistence must be performed immediately). Other versions trigger dumping probabilistically based on the journal size (the larger the size, the more likely to trigger it).

CPU-load-based dumping. The classic persistence is triggered when the CPU load is predicted to be low (since this is an expensive operation). The prediction can use linear predictions, for example, or more advanced predictive algorithms. The solution can use deterministic thresholds (soft and hard) or use a probabilistic approach.

Configuration-load-based dumping. The classic persistence is triggered when the rate of configuration requests is predicted to be low (since this is an expensive operation). The prediction can use linear predictions, for example, or more advanced predictive algorithms. The solution can use deterministic thresholds (soft and hard) or use a probabilistic approach.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to computing systems 102 in a cloud 402 or elsewhere, and thereby provide cybersecurity and efficiency enhancements that improve device configuration 202 persistence 1106. In particular, some embodiments provide configuration value persistence management (CVPM) tools and techniques that are capable of performing 1102 faster persistence 1106 of networking device configuration values 208 than classic approaches such as dumping 1012 alone without 1108 any coordinated journaling 1004 of configuration values 208.

CVPM functionality (e.g., per system 300, system 500, method 1000, or method 1100) consolidates 1154 configuration dump events 1158 based on certain dump conditions 504. Configuration value changes 200 are journaled 1004. Running configuration values 208 are dumped 1012 to a data store 210 only when the dump conditions 504 are satisfied 1010, instead of dumping 1012 all of the running configuration values 208 whenever any of them is changed. Both the persistence 1106 of configurations 202 and the restoration 1138 of persisted configurations 202 are described.

Configuration dump conditions 504 may utilize device availability indicators (e.g., maintenance mode indicator 702, software reload indicator 704, reboot indicator 706, device replacement indicator 708, database reload indicator 710), device load calculations (involving, e.g., database load 716, CPU load 720, user count 726, session count 730, process count 736), configuration change load calculations (involving, e.g., configuration change request rate 742), dump age 746, or journal size 750, for example, or combinations thereof, together with various thresholds 1146. Thresholds 1146 may be hard, soft, or probabilistic. A wide variety of kinds of configuration values 208 (e.g., per FIGS. 6 and 8) for many different kinds of networking devices 206 (e.g., per FIG. 9) operating in various environments 100 (e.g., per FIGS. 3 and 4) may be efficiently and safely persisted 1106 and restored 1138 using CVPM functionality as taught herein (e.g., per all Figures and accompanying text).

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 10 and 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific dump condition calculations and formulas, specific kinds of networking devices, and specific kinds of configuration values, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A networking profile configuration value persistence management system, comprising:
    a configuration dump store including digital storage;
    a configuration change journal including additional digital storage; and
    a configuration value persistence management processor in operable communication with the configuration change journal and the configuration dump store, the configuration value persistence management processor configured to perform configuration value persistence management steps which include (a) receiving a configuration change request specifying one or more configuration values of a networking profile which facilitates management of network communications, (b) journaling the received configuration change request by appending it to the configuration change journal, (c) submitting the received configuration change request for application to at least one networking device, (d) determining that a configuration dump condition is satisfied after one or more instances of said receiving, journaling, and submitting, and (e) in response to determining that the configuration dump condition is satisfied, dumping current configuration values of the at least one networking device and clearing the configuration change journal;

whereby the networking profile configuration value persistence management system persists configuration change requests associated with networking profiles, and does so with a lower computational overhead than would be incurred by dumping all of the configuration values without journaling any of them.

2. The system of claim 1, wherein the configuration change request specifies at least one of the following configuration values:
- a routing table entry;
- a firewall rule;
- a virtual private network endpoint;
- an encryption protocol;
- a network communication protocol;
- a security credential;
- a list of one or more allowed domains or endpoints;
- a list of one or more disallowed domains or endpoints; or
- a service level agreement policy.

3. The system of claim 1, wherein the configuration dump condition specifies at least one of the following:
- a maintenance mode indicator for a networking device transition into a maintenance mode;
- a reboot indicator for a networking device reboot;
- a software reload indicator for a networking device software reload;
- a database reload indicator for a networking device database reload; or
- a replacement indicator for a networking device replacement.

4. The system of claim 1, wherein the configuration dump condition specifies at least one of the following:
- a CPU load threshold for comparison to a predicted CPU load;
- a database transaction threshold for comparison to a predicted database transaction count;
- a user count threshold for comparison to a user count;
- a session count threshold for comparison to a session count; or
- a process count threshold for comparison to a process count.

5. The system of claim 1, wherein the configuration dump condition specifies at least one of the following:
- a configuration change request rate threshold for comparison to a configuration change request rate;
- a configuration dump age threshold for comparison to a configuration dump age; or
- a configuration change journal size threshold for comparison to a configuration change journal size.

6. The system of claim 1, wherein the configuration value persistence management processor is further configured to perform configuration value persistence management steps which include:
reading from the configuration dump store one or more dumped configuration values;
applying the dumped configuration values to the networking device;
reading from the configuration change journal one or more journaled configuration values; and
after the dumped configuration values are applied, applying the journaled configuration values to the networking device.

7. A method of managing persistence of configuration values of a networking device, comprising:
receiving a configuration change request specifying one or more configuration values;
journaling the received configuration change request by appending it to a configuration change journal;
submitting the received configuration change request for application to at least one networking device;
determining that a configuration dump condition is satisfied after one or more instances of said receiving, journaling, and submitting; and
in response to determining that the configuration dump condition is satisfied, dumping current configuration values of the at least one networking device and clearing the configuration change journal.

8. The method of claim 7, wherein dumping current configuration values of a particular networking device comprises:
disallowing any application of configuration changes to the particular networking device;
writing to a configuration dump store at least one configuration value of the particular networking device; and then
allowing a configuration change to be applied to the particular networking device.

9. The method of claim 7, wherein the configuration change request specifies one or more configuration values by specifying at least one of the following:
- a configuration value that identifies a network node M that is one hop away from a network node N;
- a configuration value that specifies a network node M is reachable from a network node N;
- a configuration value that identifies a network subnet;
- a configuration value that identifies a trust domain;
- a configuration value that identifies a protocol for use by a network node M in communicating with a network node N;
- a configuration value that identifies a particular cloud tenant; or
- a configuration value that identifies a particular customer.

10. The method of claim 7, further comprising:
reading from the configuration dump store a collection D of dumped configuration values;
applying each of the collection D dumped configuration values to at least one networking device, whereby the collection D is applied to multiple networking devices;
reading from the configuration change journal a collection J of journaled configuration values;
applying each of the collection J journaled configuration values to at least one networking device, whereby the collection J is applied to multiple networking devices; and
wherein for each of the networking devices, applying dumped configuration values, if any, precedes applying journaled configuration values, if any.

11. The method of claim 10, further comprising inhibiting traffic processing by a networking device M until after the journaled configuration values are applied, by doing at least one of the following:

dropping traffic that is directed at the networking device M;

diverting traffic that was directed at the networking device M by directing that traffic instead at a networking device N; or buffering traffic that is received at the networking device M and delaying or avoiding content processing within the networking device M of any buffered traffic, wherein content processing includes one or more of: forwarding buffered traffic to another networking device N based on address content of the buffered traffic, or providing payload content of the buffered traffic to an application program running on the networking device M.

12. The method of claim 7, wherein:

the method is performed within a cloud;

the method further comprises noting a resource change action by an owner of a networking profile, wherein the resource change action includes creating, deleting, or modifying a resource in the cloud; and the configuration change request is triggered by the resource change action.

13. The method of claim 7, wherein determining that a configuration dump condition is satisfied comprises at least one of the following:

determining that an actual size or a predicted size of the configuration change journal has crossed a specified soft journal size threshold which indicates dumping is allowed;

determining that an actual size or a predicted size of the configuration change journal has crossed a specified hard journal size threshold which makes dumping a high priority; or basing dumping at least in part on an actual size or a predicted size of the configuration change journal, in that a larger journal size is more likely to trigger dumping than a smaller journal size.

14. The method of claim 7, wherein determining that a configuration dump condition is satisfied comprises at least one of the following:

determining that an actual size or a predicted size of a processor load of the networking device has crossed a specified soft processor load size threshold which indicates dumping is allowed;

determining that an actual size or a predicted size of a processor load of the networking device has crossed a specified hard processor load size threshold which indicates dumping has a high priority; or basing dumping at least in part on an actual size or a predicted size of a processor load of the networking device, in that a smaller processor load size is more likely to trigger dumping than a larger processor load size.

15. The method of claim 7, wherein determining that a configuration dump condition is satisfied comprises at least one of the following:

determining that an actual size or a predicted size of a configuration change load has crossed a specified soft configuration change load size threshold which indicates dumping is allowed;

determining that an actual size or a predicted size of a configuration change load has crossed a specified hard configuration change load size threshold which indicates dumping has a high priority; or basing dumping at least in part on an actual size or a predicted size of a configuration change load of the networking device, in that a smaller configuration change load size is more likely to trigger dumping than a larger configuration change load size.

16. A computer-readable storage medium configured with data and instructions which upon execution by a processor perform a method of managing configuration values of a networking device, the method comprising:

reading from a non-volatile configuration dump store one or more dumped configuration values;

applying the dumped configuration values to the networking device;

reading from a non-volatile configuration change journal one or more journaled configuration values, wherein the configuration change journal has a different format than the configuration dump store and includes configuration values persisted separately from the configuration dump store; and after the dumped configuration values are applied, applying the journaled configuration values to the networking device.

17. The configured storage medium of claim 16, wherein the method supports frequent resource change actions by reducing configuration change request persistence computational overhead by consolidating configuration values of multiple journaling events into a single dumping event.

18. The configured storage medium of claim 16, wherein the method further comprises:

receiving a configuration change request;

journaling the received configuration change request by appending it to the configuration change journal;

determining that a configuration dump condition is satisfied after one or more instances of said receiving and journaling; and in response to determining that the configuration dump condition is satisfied, dumping current configuration values of the at least one networking device and clearing the configuration change journal.

19. The configured storage medium of claim 16, wherein the networking device for which configuration values are read from the configuration dump store or read from the configuration change journal or both includes at least one of the following: a switch, a router, a bridge, a gateway, a wireless access point, a networked printer, a VoIP device, an Internet of Things device, a virtual networking device, a physical networking device, a device configured by a database, or a storage device.

20. The configured storage medium of claim 16, wherein configuration values are read from the configuration dump store or read from the configuration change journal or both for a plurality of networking devices which are each located in a cloud, and wherein each of the plurality of networking devices includes at least one of the following: a switch, a router, or a firewall.

* * * * *